United States Patent [19]

Yu

[11] Patent Number: 5,294,173

[45] Date of Patent: Mar. 15, 1994

[54] SADDLE SUPPORT FOR A BICYCLE SADDLE

[75] Inventor: Tsai-Yun Yu, Taichung Hsien, Taiwan

[73] Assignee: Velo Enterprise Co., Ltd., Taichung Hsien, Taiwan

[21] Appl. No.: 82,614

[22] Filed: Jun. 25, 1993

[51] Int. Cl.⁵ .............................................. B62J 1/00
[52] U.S. Cl. ...................................................... 297/195.1
[58] Field of Search ................ 297/195.1, 203, 215.14, 297/215.13

[56] References Cited

U.S. PATENT DOCUMENTS

| | | | |
|---|---|---|---|
| 4,429,915 | 2/1984 | Flager | 297/195.1 X |
| 4,768,826 | 9/1988 | Kashima | 297/195.1 |
| 5,190,345 | 3/1993 | Lin | 297/195.1 |

*Primary Examiner*—Kenneth J. Dorner
*Assistant Examiner*—Milton Nelson, Jr.
*Attorney, Agent, or Firm*—Christie, Parker & Hale

[57] ABSTRACT

A saddle support of a metal tubular body is mounted to the bottom side of a bicycle saddle and has a front section, a substantially horizontal intermediate section, and a rear section. The front section has a substantially horizontal V-shaped portion connected to a front section of the bottom side of the bicycle saddle, and a diverging portion having two downwardly inclined arms which extend rearwardly and respectively from two ends of the horizontal V-shaped portion. The intermediate section has two parallel arms which extend rearwardly and respectively from distal ends of the downwardly inclined arms. The rear section has two upwardly inclined arms which extend rearwardly and respectively from distal ends of the parallel arms. Each of the upwardly inclined arms of the rear section has a rear end which supports a rear section of the bottom side of the bicycle saddle. A solid metal reinforcing rod is inserted fittingly into each of the parallel arms and has two rounded ends and extends between the front section and the rear section of the saddle support in the respective one of the parallel arms.

2 Claims, 4 Drawing Sheets

SADDLE SUPPORT FOR A BICYCLE SADDLE

BACKGROUND OF THE INVENTION

1. Field of the Invention

This invention relates to a saddle support for a bicycle saddle, more particularly to a saddle support which has solid metal reinforcing rods inserted fittingly into an intermediate section thereof in order to prevent breakage of the saddle support at the intermediate section.

2. Description of the Related Art

Referring to FIG. 1, a conventional bicycle seat (10) includes a bicycle saddle (11), a saddle support (12) to be mounted to the bottom side of the bicycle saddle (11), and a seat post (13) connected securely to the intermediate section (121) of the saddle support (12).

Referring to FIG. 2, the saddle support (12) has resilient properties so as to lessen the vibrations felt when the bicycle is in use. However, when the saddle support (12) bears a heavy load for a long period of time, the intermediate section (121) of the saddle support (12) breaks off easily at two end portions (122) that contact two ends of the seat post (13).

SUMMARY OF THE INVENTION

The main object of this invention is to provide a saddle support for a bicycle saddle which has solid metal reinforcing rods inserted fittingly into an intermediate section thereof in order to prevent breakage of the saddle support at the intermediate section.

According to this invention, a saddle support is made of metal and is to be mounted to the bottom side of a bicycle saddle. The saddle support is a tubular body and has a front section, a substantially horizontal intermediate section, and a rear section. The front section has a substantially horizontal V-shaped portion connected to a front section of the bottom side of the bicycle saddle, and a diverging portion having two downwardly inclined arms which extend rearwardly and respectively from two ends of the horizontal V-shaped portion. The intermediate section has two parallel arms which extend rearwardly and respectively from distal ends of the downwardly inclined arms. The rear section has two upwardly inclined arms which extend rearwardly and respectively from distal ends of the parallel arms of the intermediate section. Each of the upwardly inclined arms of the rear section has a rear end which supports a rear section of the bottom side of the bicycle saddle. A solid metal reinforcing rod is inserted fittingly into each of the parallel arms of the intermediate section. Each reinforcing rod has two rounded ends and extends between the front section and the rear section of the saddle support in the respective one of the parallel arms.

BRIEF DESCRIPTION OF THE DRAWING

Other features and advantages of the present invention will become apparent in the following detailed description of a preferred embodiment, with reference to the accompanying drawings, of which.

DETAILED DESCRIPTION OF THE PREFERRED EMBODIMENT

Figure 1:
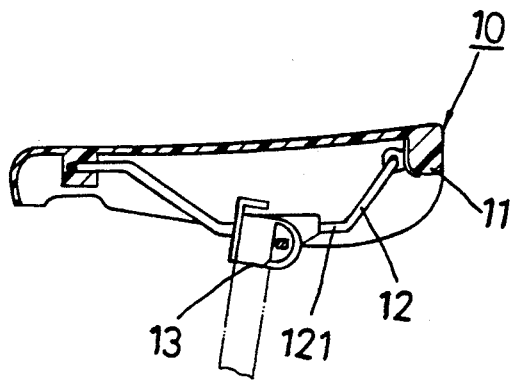
FIG. 1 is a sectional view of a conventional bicycle seat which includes a bicycle saddle and a saddle support.
Figure 2:
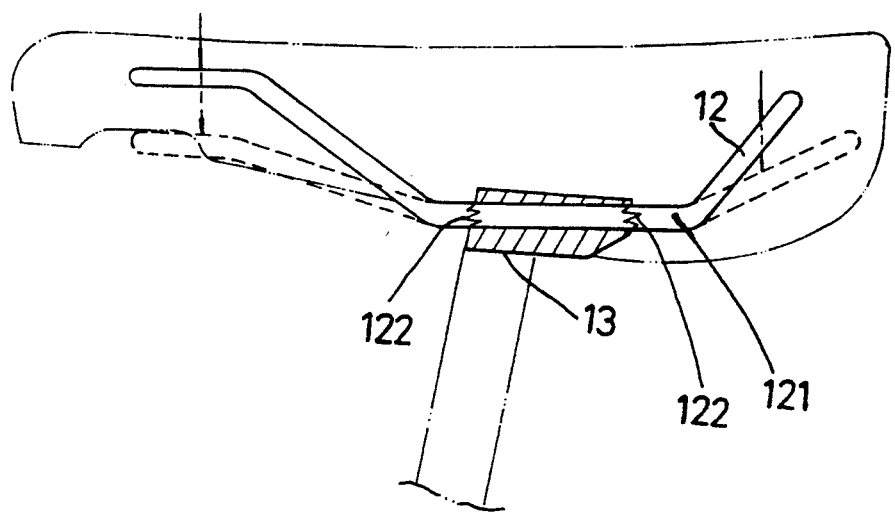
FIG. 2 is a schematic view illustrating the saddle support of the conventional bicycle seat breaking off due to prolonged application of a heavy load.
Figure 3:
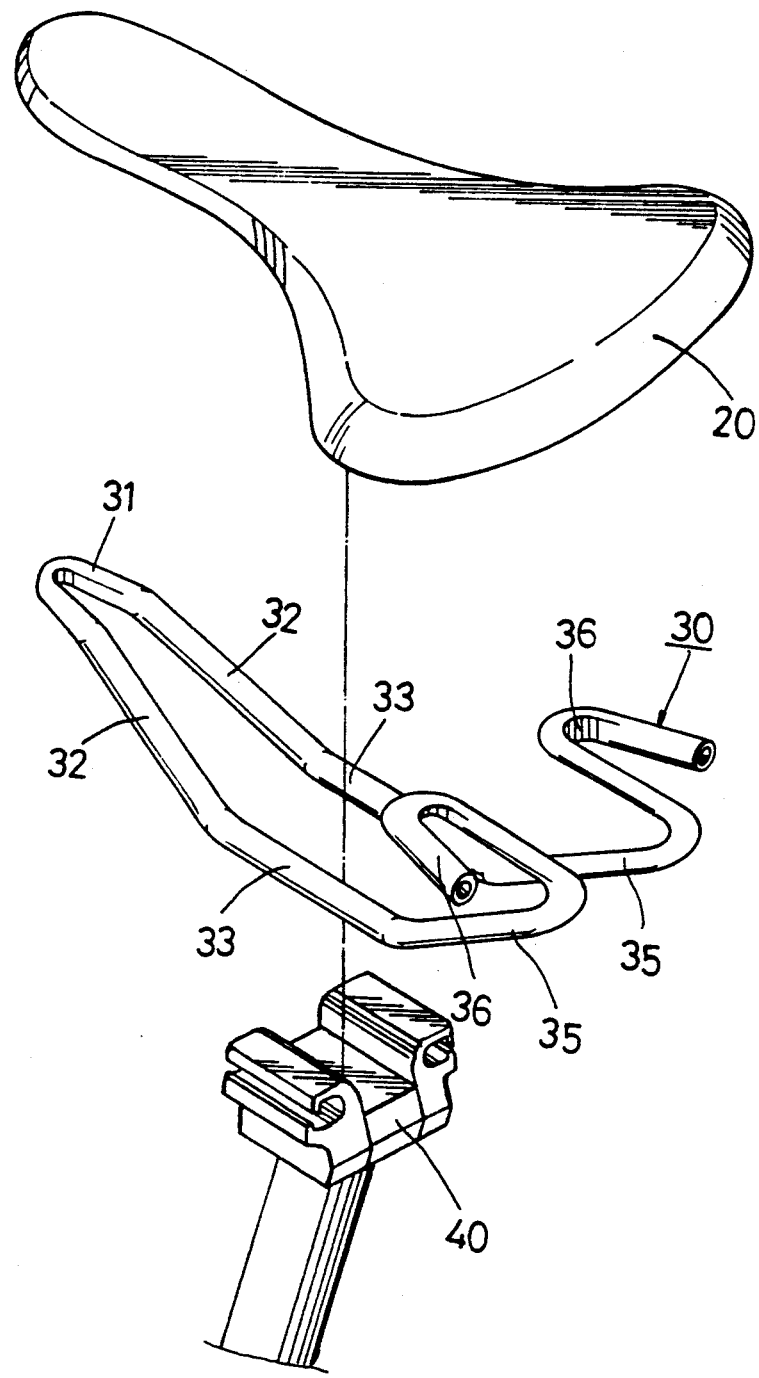
FIG. 3 is a perspective view showing the preferred embodiment of a saddle support according to this invention, the saddle support being detached from the bicycle saddle and the seat post.
Figure 4:
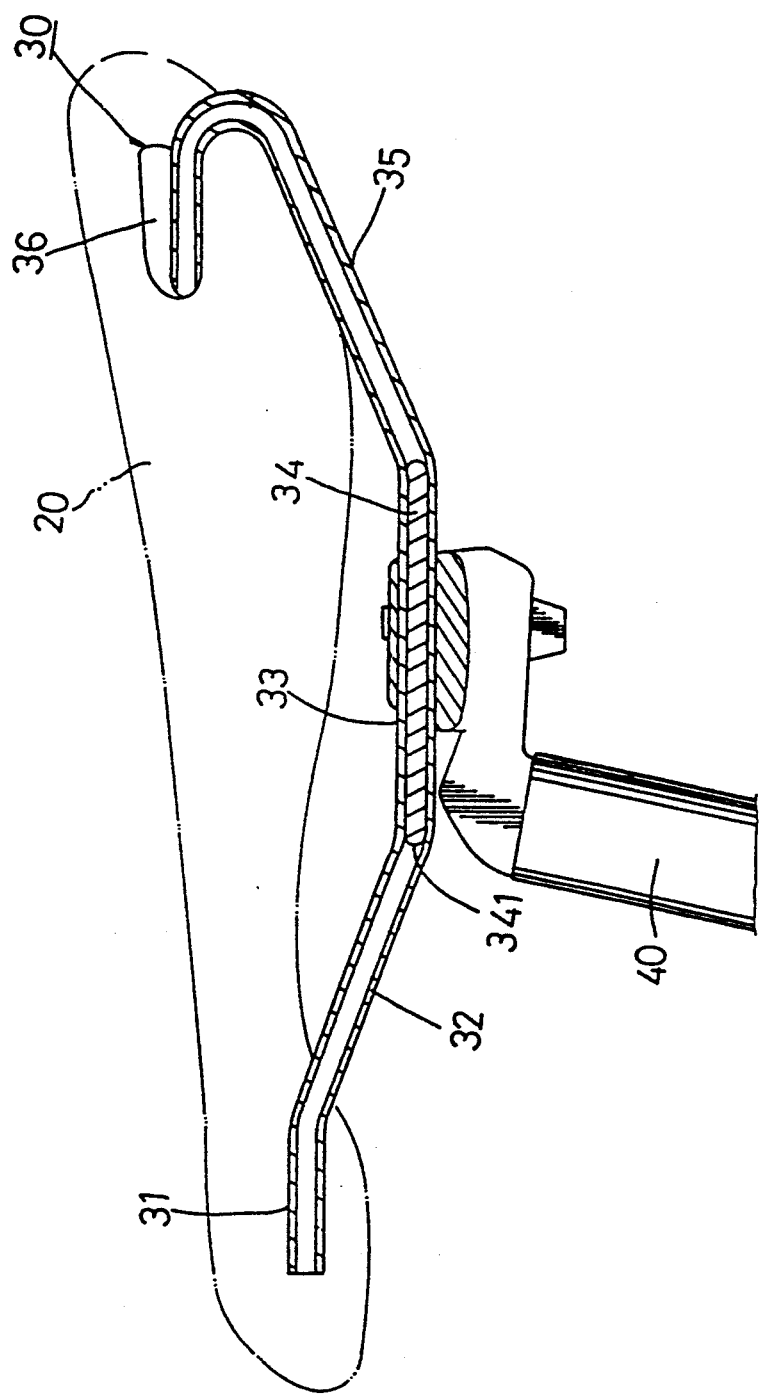
FIG. 4 a sectional view showing the saddle support of this invention with a solid metal reinforcing rod inserted into the intermediate section thereof.
Figure 5:
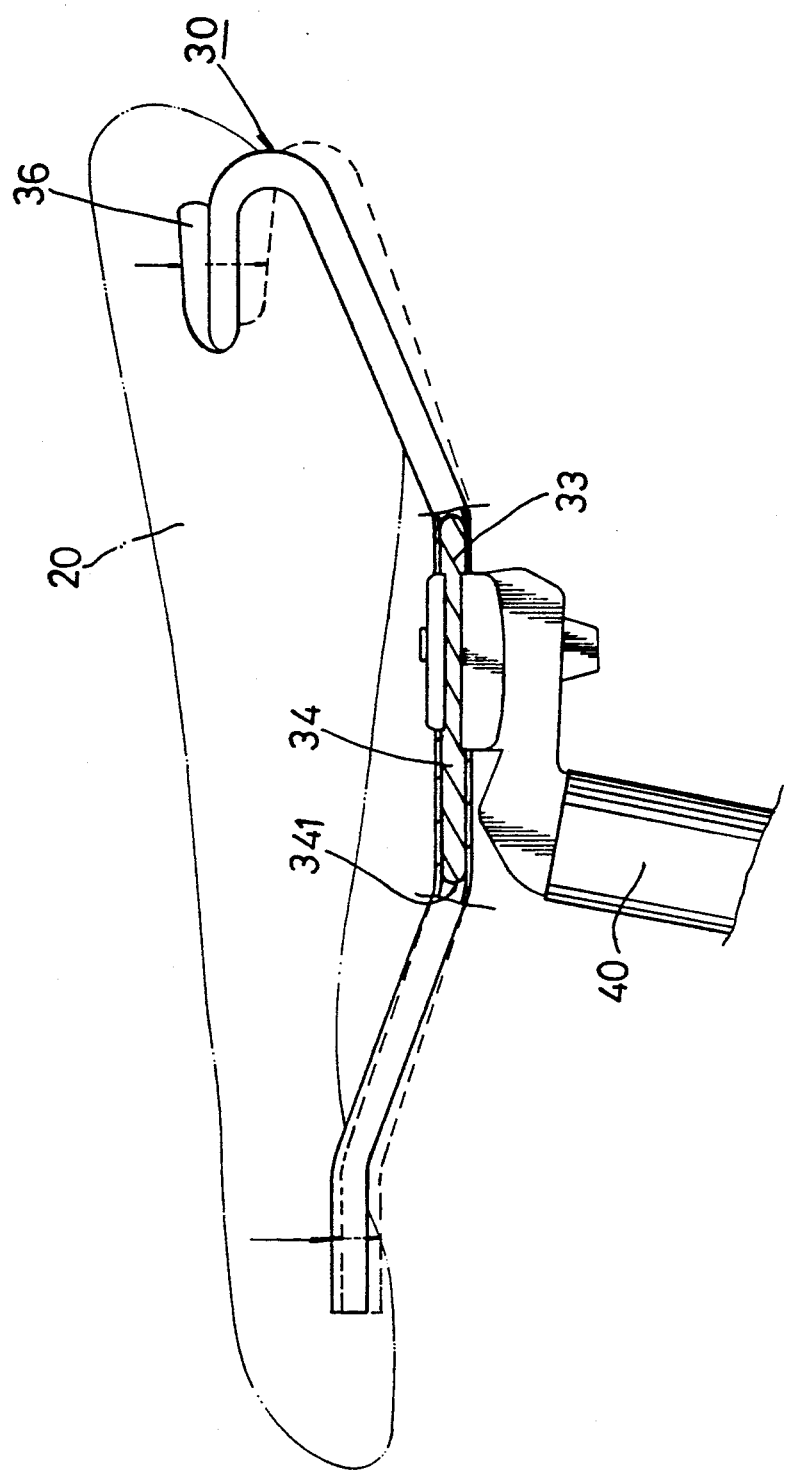
FIG. 5 is a schematic view illustrating the depression of the saddle support of this invention when pressure is applied on the bicycle saddle.

Referring to FIGS. 3 and 4, the preferred embodiment of a saddle support (30) of this invention is made of metal and is to be mounted to the bottom side of a bicycle saddle (20). The saddle support (30) is a tubular body and includes a front section, a substantially horizontal intermediate section, and a rear section. The front section has a substantially horizontal V-shaped portion (31) connected to a front section of the bottom side of the bicycle saddle (20), and a diverging portion having two downwardly inclined arms (32) which extend rearwardly and respectively from two ends of the horizontal V-shaped portion (31). The intermediate section has two parallel arms (33) which extend rearwardly and respectively from distal ends of the downwardly inclined arms (32) and which are connected securely to the upper end portion of a seat post (40). The rear section has two upwardly inclined arms (35) which extend rearwardly and respectively from distal ends of the parallel arms (33) of the intermediate section. Each of the upwardly inclined arms (35) of the rear section has a rear end. Two distal outwardly bent hook ends (36) extend respectively from the rear ends of the upwardly inclined arms (35) and support a rear section of the bottom side of the bicycle saddle (20). A solid metal reinforcing rod (34) is inserted fittingly into each of the parallel arms (33) of the intermediate section and extends between the front section and the rear section of the saddle support (30) in the respective one of the parallel arms (33) in order to avoid breaking of the parallel arms (33) at two end portions thereof when the saddle support bears a heavy load for a long period of time. Each of the reinforcing rods (34) preferably has two rounded ends (341). Accordingly, with reference to FIG. 5, the rounded ends (341) of the reinforcing rod (34) prevent the reinforcing rods (34) from obstructing movement of the front and rear sections of the saddle support (30) when the saddle support (30) is in use.

With this invention thus explained, it is apparent that numerous modifications and variations can be made without departing from the scope and spirit of this invention. It is therefore intended that this invention be limited only as indicated in the appended claims.

I claim:

1. A saddle support for a bicycle saddle, said saddle support being made of metal and being mounted to a bottom side of said bicycle saddle, wherein the improvement comprises:

said saddle support being a tubular body with a front section which has a substantially horizontal V-shaped portion connected securely to a front section of said bottom side of said bicycle saddle and a diverging portion that has two downwardly inclined arms which extend rearwardly and respectively from two ends of said horizontal V-shaped portion of said front section, a substantially horizontal intermediate section having two parallel arms which extend rearwardly and respectively from distal ends of said downwardly inclined arms, and a rear section having two upwardly inclined arms which extend rearwardly and respectively from distal ends of said parallel arms of said intermediate section, each of said upwardly inclined arms of said rear section having a rear end which supports a rear section of said bottom side of said bicycle saddle; and a solid metal reinforcing rod inserted fittingly into each of said parallel arms of said intermediate section, each said reinforcing rod extending between said front section and said rear section of said saddle support in a respective one of said parallel arms.

2. A saddle support for a bicycle saddle as claimed in claim 1, wherein each said reinforcing rod has two rounded ends.

* * * * *

UNITED STATES PATENT AND TRADEMARK OFFICE
CERTIFICATE OF CORRECTION

PATENT NO. : 5,294,173
DATED : March 15, 1994
INVENTOR(S) : Tsai-Yun Yu

It is certified that error appears in the above-indentified patent and that said Letters Patent is hereby corrected as shown below:

Column 2, line 3, after FIG. 4 insert -- is --.

Signed and Sealed this

Tenth Day of January, 1995

*Attest:*

BRUCE LEHMAN

*Attesting Officer*    *Commissioner of Patents and Trademarks*